Jan. 10, 1967          J. E. HINES          3,297,312

COMBINATION SHOCK ABSORBER AND SPRING

Filed March 29, 1965

INVENTOR.
James E. Hines

BY

Hovey, Schmidt, Johnson & Hovey
ATTORNEYS.

United States Patent Office 3,297,312
Patented Jan. 10, 1967

3,297,312
COMBINATION SHOCK ABSORBER AND SPRING
James E. Hines, Raytown, Mo.
(1007 S. Pope, Independence, Mo. 64050)
Filed Mar. 29, 1965, Ser. No. 443,465
12 Claims. (Cl. 267—34)

This invention relates to improvements in shock absorbers and has as its primary object the provision of motion damping apparatus which is constructed to serve as a combination spring and shock absorber when the apparatus becomes a part of the suspension system of a vehicle, whereby the suspension system is simplified and thereby more economical to produce and maintain without sacrificing the desired cushioning and shock-absorbing features thereof.

Another object of this invention is the provision of a combined spring and shock-absorbing assembly of the type described which provides improved stabilizing characteristics for the suspension system of a vehicle especially during movement of the latter over bumps and into ruts and depressions of a roadway, whereby shocks imparted to the assembly will be effectively dissipated to thereby minimize or substantially eliminate any discomfort to the occupants of the vehicle due to its movement over the roadway.

Yet another object of this invention is the provision of an assembly of the aforesaid character which is so constructed as to form a self-contained unit requiring only a minimum of skill and effort to couple the same to the suspension system of a vehicle.

Another object of the present invention is the provision of a combination spring and shock absorber unit which may be utilized with the suspension system of an existing vehicle without substantial modification thereto and may be used at the rear end of a vehicle, such as an automobile or the like, as well as at the forward end thereof, whereby the unit may be universally applied to many types of vehicles as a replacement part for the suspension systems thereof.

Figure 1:
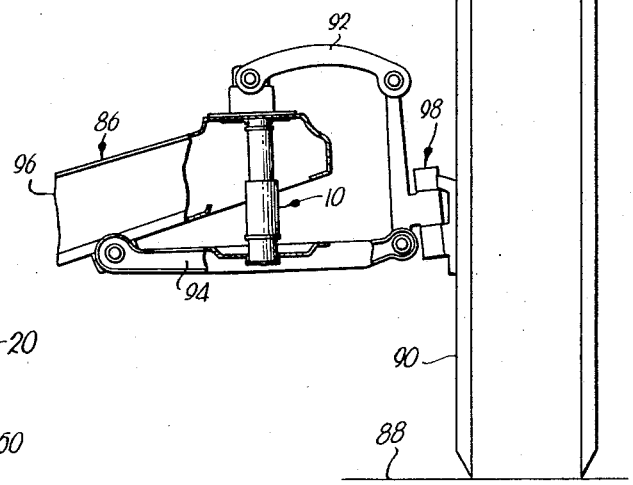
FIGURE 1 is a fragmentary, front elevational view of the suspension system of a vehicle, such as an automobile or the like, and illustrating the use therewith of the combination spring and shock-absorber unit forming the subject of this invention.

The combination spring and shock-absorber apparatus or unit 10 includes a pair of interconnected tubular sections 12 and 14 which are longitudinally aligned and preferably have a common longitudinal axis. Section 12 includes a pair of relatively shiftable, relatively telescoped tubes 16 and 18, tube 18 being disposed within tube 16 and having a length less than the length of tube 16. An annular seal 20 on one end of tube 16 seals the junction between tubes 16 and 18, yet permits shifting movement of tube 18 relative to tube 16.

Figure 3:
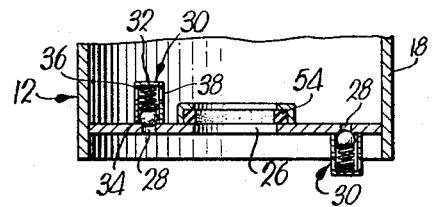
FIG. 3 is a fragmentary, cross-sectional view of a portion of the unit illustrating a pair of check valves thereof.
Figure 4:
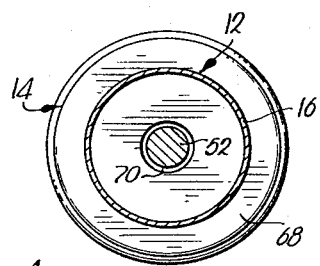
FIG. 4 is a cross-sectional view taken along line 4—4 of FIG. 2.

Tube 18 is provided with a pair of closures 22 and 24 at the ends thereof, closure 24 being threadably mounted on the outer end of tube 18, while closure 22 is provided with a central opening 26 and a pair of orifices 28 on opposed sides of opening 26 as shown in FIG. 3.

A check valve 30 provided for each orifice 28 respectively, includes a tubular housing 32, a spherical valve element 34, and a bias spring 36 within housing 32 for urging element 34 into closing relationship with its orifice 28. Housing 32 is provided with a number of openings 38 therethrough, whereby fluid flowing through orifice 28 and into housing 32 may pass out of the latter through openings 38. As shown in FIG. 3, one of the check valves 30 permits flow into tube 18; whereas the other check valve 30 permits fluid flow out of tube 18.

A coil spring 40 is disposed within tube 18 and extends between closure 22 and a plate 42 having a tubular internally threaded extension 44 at the center thereof. Plate 42 has an annular skirt 46 for maintaining spring 40 centrally disposed within tube 18. Plate 42 is threadably connected to the externally threaded end portion 50 of a rod 52 extending through opening 26 and being shiftable with respect to closure 22. An annular seal 54 carried by closure 22 in surrounding relationship to opening 26, normally engages the outer surface of rod 52 as the latter reciprocates with respect to closure 22.

Closure 24 is removable from tube 18 so that plate 42 can be connected to end portion 50. Plate 42 is spaced from closure 24 a distance to preclude interengagement of these components during normal usage of unit 10. End portion 50 and rod 52 are surrounded by spring 40, the latter being normally under compression to bias plate 42 toward closure 24.

Section 14 includes a pair of relatively shiftable, relatively telescoped members or tubes 60 and 62, tube 60 having a closure 64 provided with an opening for receiving the opposite end of rod 52 and tube 62 having a seal 65 engaging tube 60. A nut 66 releasably secures rod 52 to closure 64.

Figure 2:
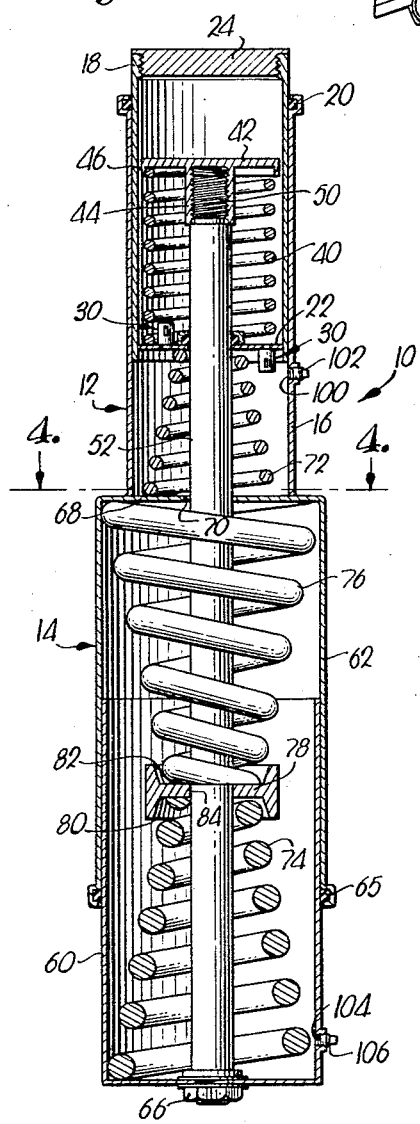
FIG. 2 is an enlarged, cross-sectional view of the unit.

Tube 62 is provided with a closure 68 having a central opening 70 through which rod 52 extends, tube 16 being rigidly secured to and extending outwardly from closure 68 as shown in FIG. 2. Opening 70 has a transverse dimension greater than the corresponding transverse dimension of rod 52 so that sections 12 and 14 are disposed in fluid communication with each other at all times. The connection of rod 52 with closure 64 and the aligning function of seal 54 maintains rod 52 is a substantially fixed position with respect to closure 68.

A coil spring 72 between closures 22 and 68 is normally under compression to bias tube 18 away from closure 68. As shown in FIG. 2, rod 52 is surrounded by spring 72, the latter having a substantially frusto-conical configuration to minimize the axial length of the spring when the same is fully compressed.

A pair of coil springs 74 and 76 are disposed within tubes 60 and 62 respectively, spring 74 extending inwardly from closure 64 and spring 76 extending inwardly from closure 68. A guide 78 has a pair of depressions 80 and 82 is opposed faces thereof for receiving the inner ends of springs 74 and 76 respectively. Guide 78 has a central opening 84 for shiftably receiving rod 52. Springs 74 and 76 are of frusto-conical configuration so that the axial lengths thereof will be minimized in the event that both springs are fully compressed.

The force constant of spring 74 is preferably greater than that of spring 76. Thus, a greater force is required to compress spring 74 per unit distance than is required to compress spring 76 per unit distance. Springs 74 and 76 are normally under compression and are coupled with springs 40 and 72 by virtue of rod 52.

Section 14 is adapted to contain a hydraulic fluid, such as oil or the like. Preferably, the hydraulic fluid fills section 14 and partially fills section 12 so that when unit 10 is vertically disposed in the manner shown in FIG. 2, the level of the hydraulic fluid is between closures 22 and 68. Thus, the hydraulic fluid cooperates with the various springs of sections 12 and 14 to dissipate and cushion shocks and the like which are exerted on tubes 18 and 60 and transmitted to the associated springs. It is clear that if the hydraulic fluid fills the space between closures 22 and 68, the fluid may enter tube 18 through one of the check valves 30. Similarly, the fluid may gravitate from tube 18 through the other check valve 30 when the level of the fluid drops below closure 22 as unit 10 is vertically disposed.

In use, unit 10 is coupled with the suspension system of a vehicle. For purposes of illustration only, unit 10 is shown in FIG. 1 as being coupled to the suspension system 86 at the front end of a vehicle, such as an automobile or the like. System 86 is supported above ground level 88 by a wheel 90. System 86 includes a pair of rocker arms 92 and 94 pivotally mounted on frame 96, the outer ends of arms 92 and 94 being coupled with wheel 90 by axle structure 98. Unit 10 is disposed between frame 96 and arm 94 with tubes 18 and 60 effectively biased outwardly by spring 72 and spring 74 and 76 respectively. Hence, no physical connection is required between tubes 18 and 60 and suspension system 86. However, structure may be provided on system 86 to prevent any substantial lateral movement of unit 10 with respect thereto.

During normal travel over a roadway, wheel 90 will pass over bumps and into depressions in the roadway. As wheel 90 passes over a bump, arm 94 will swing upwardly to urge tube 60 into tube 62. For the most part, spring 76 will cushion this movement inasmuch as spring 74 has a greater spring constant than spring 76. Inward movement of tube 60 will cause rod 52 to move upwardly. Since spring 40 is normally under compression, plate 42 will move upwardly with rod 52. As tube 60 moves into tube 62, the volume of section 14 decreases and hydraulic fluid therein will be forced through opening 70 into section 12. For small bumps, there will be a minimum flow of hydraulic fluid into section 12 inasmuch as spring 76 will effectively cushion shocks imparted to tube 60 by arm 94. However, for large bumps, the hydraulic fluid will not only pass into section 12, but will fill the space between closures 22 and 68 so that continued movement of the hydraulic fluid into the space will require the passing of the hydraulic fluid into tube 18 through the corresponding check valve 30. Thus, the hydraulic fluid will serve to prevent the bottoming out of unit 10 inasmuch as the fluid will force tube 18 out of tube 16 through at least a limited distance to thereby raise frame 96 slightly with respect to arm 94.

Also, spring 74 will serve to limit the inward travel of tube 60 when wheel 90 passes over large bumps in the roadway. As a result, springs 74 and 76, as well as the hydraulic fluid in sections 12 and 14, cooperate with section 12 to provide improved stabilizing characteristics for system 86 and thereby serve to maintain the vehicle of which system 86 forms a part substantially level even as wheel 90 passes over relatively large bumps. The hydraulic fluid within tube 18 will gravitate out of the latter through the corresponding check valve 30 when sections 12 and 14 once again assume their normal operative positions. Thus, tube 18 normally is free of hydraulic fluid.

As wheel 90 passes into ruts or depressions in the roadway, tube 60 will tend to move outwardly of tube 62 so that rod 52 will move downwardly. The downward movement of rod 52 is dissipated by springs 40 and 72, as well as the hydraulic fluid in the space between closures 22 and 68. The metering effect of opening 70 is sufficient to permit passage of the hydraulic fluid into section 14 as the volume thereof is increased; however, if the downward travel of rod 52 is too great, some of the fluid may pass into tube 18 through the corresponding check valve 30 without damage to the components of unit 10. For the most part, spring 72 will prevent any substantial movement of tube 18 into tube 16 as tube 60 moves outwardly of tube 62. Hence, frame 96 will remain substantially level as arm 94 swings downwardly. To accomplish this, the force constant of spring 72 is preferably greater than that of spring 40 so that the latter will cushion the relatively small shocks arising due to the slight downward swinging movements of arm 94.

Unit 10 also provides stability for system 86 during cornering and operates to maintain frame 96 substantially level regardless of the direction in which the vehicle turns. Assuming wheel 90 of FIG. 1 is on the left front portion of a vehicle, frame 96 will tend to rotate in a clockwise sense when viewing FIG. 1 during a right turn. This will tend to force tube 18 further inwardly of tube 16 so that the body of the vehicle, carried by frame 96, will also tilt in a clockwise sense when viewing FIG. 1. However, inward movement of tube 18 is countered by spring 72 which is normally under compression and the hydraulic fluid within section 12. The hydraulic fluid may pass into tube 18 from tube 16 by virtue of one of the check valves 30. However, the last-mentioned check valve will meter the hydraulic fluid and thereby minimize the inward movement of tube 18.

Similarly, during a right turn, the inward movement of tube 60 will be minimized by virtue of springs 74 and 76. Also, the hydraulic fluid in section 14 must be metered through opening 70 as section 14 is reduced in volume; therefore, the hydraulic fluid also has an effect on the minimizing of the inward movement of tube 60. As a result, frame 96 adjacent to left front wheel 90 remains substantially level during a right turn. A unit 10 adjacent to the left rear wheel 90 of a vehicle will operate in the same manner so that the entire body of the vehicle will remain substantially level during a right turn.

During a left turn of the vehicle, the body thereof will tend to tilt to the right and this tendency will be countered by a pair of units 10 at the right front and right rear of the vehicle so as to maintain frame 96 substantially level and thereby minimize the tilting of the body of the vehicle. Frame 96 is maintained substantially level during a left turn in the same way in which it remains substantially level during a right turn as described above.

During sudden stops of the vehicle, the front end thereof will tend to move downwardly. This downward movement will be countered by a pair of units 10 on the left front and the right front of the vehicle in the manner described above with respect to cornering. In this case, the inward movements of tubes 18 and 60 of each unit will be minimized to thereby counter the tendency for downward movement of the front end of the vehicle.

Similarly, if a pair of units 10 are mounted at the rear of the vehicle, downward movement of the rear end of the vehicle during sudden starts or the like, will be minimized in the same way as downward movements of the front end thereof during sudden stops. Here again, tubes 18 and 60 of each unit 10 at the rear of the vehicle remain substantially in their equilibrium positions to thereby prevent the downward movement of the vehicle at the rear thereof.

It is evident, therefore, that frame 96 of a vehicle will remain substantially level at all times during forward and reverse travel over a roadway as the vehicle is turned to the right, or to the left, and when the vehicle is started abruptly or brought to a quick halt. Unit 10, being self-contained, serves not only as a shock absorber, but also a spring for system 86 adjacent to each ground-engaging wheel of the vehicle of which system 86 forms a part. Unit 10 is constructed to have a long operating life and to be easily replaced if such becomes necessary.

A filler opening 100 is provided in tube 16 to direct hydraulic fluid into unit 10. A filler plug 102 normally closes opening 100. A drain opening 104 in tube 60 adjacent to closure 64 permits draining of the hydraulic fluid from unit 10. A drain plug 106 normally closes opening 104.

Changes may be made in the construction of unit 10 without departing from the scope of this invention. For instance, closure 24 may be releasably secured to tube 18 by bolt means rather than being threaded thereto as shown. In addition, connector means may be utilized on closures 24 and 64 so as to releasably interconnect unit 10 at the ends thereof with frame 96 and arm 94.

Having thus described the invention, what is claimed as new and desired to be secured by Letters Patent is:

1. Shock-absorbing apparatus comprising:
   a pair of sections, each section including a pair of elongated members coupled together in longitudinal alignment and being longitudinally shiftable relative to each other, one of the sections being secured to and extending outwardly from one end of the other section in longitudinal alignment therewith;
   first spring means coupled between the members of said one section for biasing the members thereof away from each other;
   second spring means coupled between the members of said other section for biasing the members thereof away from each other; and
   means coupling the opposite end of said one section with said second spring means, whereby inward or outward movement of the outer member of either of said sections is minimized by the spring means corresponding to the adjacent section.

2. Shock-absorbing apparatus comprising:
   a pair of aligned sections, each section including a pair of relatively shiftable, relatively telescoped tubes;
   a closure on the outer end of each tube respectively of one of the sections, the other section being secured to and extending outwardly from one of the closures, said one closure having an opening therethrough placing the sections in fluid communication with each other;
   first spring means in said one section for biasing the tubes thereof outwardly of each other;
   second spring means in said other section for biasing the tubes thereof outwardly of each other; and
   means extending through said opening and shiftable with respect to said one closure for coupling the other closure of said one section with said second spring means, whereby inward or outward movement of the outer tube of either of said sections is minimized by the spring means corresponding to the adjacent section.

3. Shock-absorbing apparatus as set forth in claim 2, wherein said coupling means includes a rod secured at one end thereof to said other closure, and third spring means biasing the other end of the rod in a direction away from said other closure.

4. Shock-absorbing apparatus as set forth in claim 3, wherein is provided a plate secured to said opposite end of the rod, said third spring means including a coil spring under compression and surrounding the rod.

5. Shock-absorbing apparatus as set forth in claim 4, wherein said plate is provided with an opening, said rod being shiftably received within said opening, and stop means on the rod and engageable with said plate for limiting the movement of the latter relative to the rod.

6. Shock-absorbing apparatus as set forth in claim 2, wherein said first spring means includes a pair of coil springs in end-to-end alignment, said springs being normally under compression, one of the springs having a force constant greater than the force constant of the other spring.

7. Shock-absorbing apparatus as set forth in claim 6, wherein is provided a guide coupled with the proximal ends of the springs for maintaining the springs in alignment with each other.

8. Shock-absorbing apparatus as set forth in claim 2, wherein one of the tubes of said other section is secured to and extends outwardly from said one closure, the other tube of said other section being telescoped within said one tube thereof and having a closure on the innermost end thereof, said second spring means including a coil spring disposed between said one closure and the closure on the innermost end of said other tube.

9. Shock-absorbing apparatus as set forth in claim 8, wherein said sections are adapted to contain a quantity of a hydraulic fluid, said opening being adapted to pass said hydraulic fluid between the sections, and including check valve means in the closure on said innermost end of said other tube for permitting the hydraulic fluid to pass into and out of said other tube in response to the movement of the latter in opposed directions relative to said one tube of said other section.

10. Shock-absorbing apparatus as set forth in claim 9, wherein said closure on the innermost end of said other tube is provided with an aperture therethrough aligned with the opening in said one closure, said coupling means including a rod extending through said aperture and being shiftable with respect thereto, a second spring within said other tube and extending away from said innermost closure thereof, and means on the rod in spaced relationship to the last-mentioned closure for maintaining said second spring under compression.

11. Shock-absorbing apparatus as set forth in claim 10, wherein is provided a seal carried by said innermost closure for sealing said aperture when said rod extends therethrough.

12. A combination spring and shock-absorbing unit comprising:
   a pair of sections in end-to-end alignment, each section including a pair of relatively shiftable tubes, one of the tubes of each section being telescoped within the other tube thereof;
   a first closure on the outer end of said other tube of one of the sections;
   a second closure on the outer end of said one tube of said one section, said other tube of the other section being secured at the outer end thereof to said first closure, the latter having a central opening therein placing said one section in fluid communication with said other tube of the other section;
   an inner and outer closure on the inner and outer ends respectively of said one tube of said other section;
   a pair of check valves on said inner closure, one of said valves permitting fluid flow into said one tube of the other section and the other valve permitting fluid flow out of the last-mentioned tube, said inner closure having an opening aligned with the opening of said first closure;
   a pair of first coil springs in said one section in end-to-end alignment, said springs being normally under compression for biasing said one tube of said one section outwardly of said other tube thereof, one of said springs having a force constant greater than the force constant of the other spring;
   a second coil spring in said other tube of said other section between said first closure and said inner closure, said second coil spring being normally under compression for biasing said one tube of said other section outwardly of said other tube;
   a third coil spring in said one tube of said other section and in engagement at one extremity thereof with said inner closure;
   a plate engaging said third coil spring at the opposite extremity thereof;
   a rod secured at one end thereof to said second closure and extending through said first, second and third coil springs and said openings in said first and inner closures;

means securing the opposite end of the rod to said plate, said third coil spring being normally under compression for biasing said one tube of the other section inwardly of said other tube thereof; and a seal engaging the rod at the opening of said inner closure to prevent the passage of fluid through the last-mentioned opening and to permit said rod to move relative to said inner closure, said sections being adapted to contain a hydraulic fluid therein and to be vertically disposed with said one section below said other section, whereby movements of said one tube of either section in opposed directions are minimized by the springs corresponding to the adjacent section.

References Cited by the Examiner

UNITED STATES PATENTS

| | | | |
|---|---|---|---|
| 815,188 | 3/1906 | Mans | 267—60 |
| 2,187,921 | 1/1940 | Weber | 267—34 |

ARTHUR L. LA POINT, *Primary Examiner.*

R. M. WOHLFARTH, *Assistant Examiner.*